(12) United States Patent
Liu et al.

(10) Patent No.: US 7,544,308 B2
(45) Date of Patent: Jun. 9, 2009

(54) DICHROIC DYE AND MICROENCAPSULATED LIQUID CRYSTAL COMPOSITION THEREOF

(75) Inventors: Shih-Hsien Liu, Taipei (TW); Yang-Chu Lin, Hsinchu (TW); Woan-Shiow Tzeng, Hsinchu (TW); Chih-Lin Su, Hsinchu County (TW); Kung-Lung Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 586 days.

(21) Appl. No.: 11/319,430

(22) Filed: Dec. 29, 2005

(65) Prior Publication Data
US 2006/0147652 A1 Jul. 6, 2006

(30) Foreign Application Priority Data
Dec. 31, 2004 (TW) .............................. 93141748 A

(51) Int. Cl.
*C09K 19/00* (2006.01)
*C09K 19/06* (2006.01)
*C09K 19/52* (2006.01)
*C09B 1/16* (2006.01)
*C09B 29/00* (2006.01)

(52) U.S. Cl. .............................. 252/299.01; 252/299.6; 252/299.1; 430/20; 430/270.1; 428/1.1; 428/1.2; 428/1.3; 534/688; 552/243

(58) Field of Classification Search ............ 252/299.01, 252/299.6, 299.1; 430/20, 270.1; 428/1.1–1.3; 534/688; 552/243
See application file for complete search history.

(56) References Cited
U.S. PATENT DOCUMENTS
6,033,742 A * 3/2000 Iwanaga et al. ............ 428/1.31

* cited by examiner

*Primary Examiner*—Geraldina Visconti
(74) *Attorney, Agent, or Firm*—Birch, Stewart, Kolasch & Birch, LLP

(57) ABSTRACT

Dichroic dyes, compositions thereof, and liquid crystal compositions, microencapsulated liquid crystal compositions and liquid-crystal display elements employing the same. The dichroic dyes have high photostability in addition to excellent solubility. Furthermore, the liquid crystal composition employing the above dichroic dyes can have an orientational order parameter more than 0.7.

21 Claims, 6 Drawing Sheets

DICHROIC DYE AND MICROENCAPSULATED LIQUID CRYSTAL COMPOSITION THEREOF

BACKGROUND OF THE INVENTION

1. Field of the Invention

The present invention relates to a dichroic dyes and composition thereof, and in particular relates to a dichroic dyes used in photoelectric products and microencapsulated liquid crystal compositions employing the dichroic dye.

2. Description of the Related Art

There is an increasing need for reflective liquid crystal displays for use in information products, such as E-books and PDAs, because they consume less power and are thin and light. Currently, the guest-host display mode is applied in reflective liquid crystal displays, dye being "guest" and liquid crystal being "host". The liquid crystal display effects are generated by the anisotropically optical absorption by dichroic dye which is dissolved in the mixture of nematic liquid crystal and an optically active substance. This display mode employs absorption or no absorption for visible light by dye, exhibits bright and dark characteristics corresponding to the variation of electric field and can replace reflectors. The viewing angle of this type of reflective liquid crystal display is improved and the brightness is also increased. When used, only environmental light is required, but not back light, therefore power consumption can be greatly reduced.

In guest-host display mode, dichroic dyes are used and must exhibit good dichroism, which can be quantified by the orientational order parameter ($S_D$) or dichroic ratio (N) of the dye molecules. The contrast is higher when the values of N and $S_D$ are higher. Moreover, the dye molecules in the display devices tend to deteriorate due to long term exposure to back light irradiation or environmental light (such as sun light), and the display quality is affected adversely. Accordingly, it is desirable for the dyes to have good photostability and heat stability for enhanced durability. Furthermore, the solubility of dichroic dye in liquid crystal is generally 1%~10% based on the weight of liquid crystal. The dichroic dye rotates as the liquid crystal rotates in accordance with the increase of applied electric voltage. To increase the contrast of the display, an increase in solubility and load of dichroic dye in liquid crystal is desirable to fulfill the prerequisite of avoiding reduced brightness and increased threshold electric voltage.

However, few conventional dichroic dyes meet all the requirements mentioned above. Conventional dichroic dyes, those which meet the basic requirements for dichroism and coloration, often have poor processability because of poor solubility or short product life because of poor photostability. For example, the photostability and heat stability of general azo dyes are poor, but those of anthraquinone dyes are relatively stable due to the hydrogen bond between molecules. The mono-azo dye having heterocyclic julolidine or thiazole group has relatively high photostability, but reduced solubility. U.S. Pat. No. 4,304,683 discloses an anthraquinone dye having a long chain soft hydrocarbyl group, which has an asymmetric molecular structure, but poor solubility.

Therefore, it is necessary to develop a dichroic dye with superior dichroism and solubility for liquid crystal.

BRIEF SUMMARY OF THE INVENTION

The invention provides a dichroic dye used as a yellow, orange, green, blue or red dichroic dye, depending on the molecular moiety structure. The dichroic dye comprise the structures represented by formula (I):

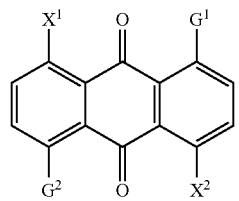

or formula(II):

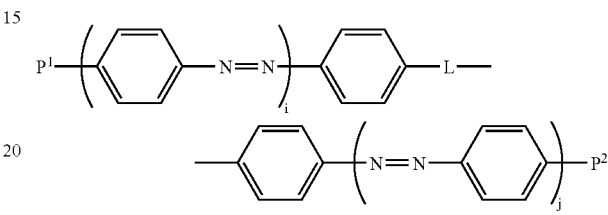

Accordingly, $X^1$ and $X^2$ are the same or different and comprise —H, —OH, or —$NH_2$. $G^1$ is

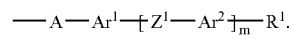

$G^2$ is H, F, Cl, Br, —$NH_2$, —$NO_2$, or

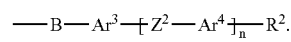

L is —CH=N—, —C≡C—C≡C—,

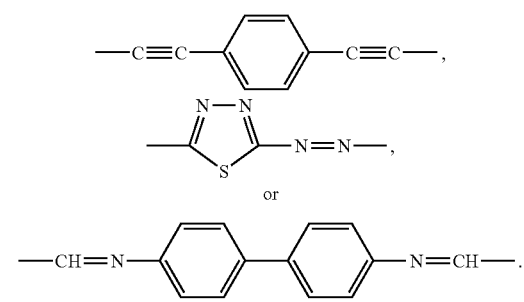

$P^2$ are the same or different and comprise —H, —$R^3$, —$OR^3$, —$NHR^3$, —$N(R^3)_2$, or

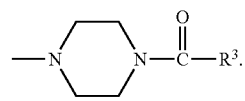

A and B independently comprise O, S, or —NH—. $Z^1$ and $Z^2$ are the same or different and comprise O, S, —C≡C—, —C≡C—, —CH=N—, —N=N—, —CH=N—,

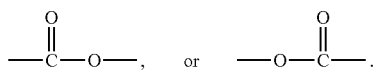

Ar¹ and Ar² are the same or different and comprise the phenyl group, biphenyl group, naphthyl group, or heterocyclic group. Ar³ and Ar⁴ are the same or different and comprise the phenyl group, biphenyl group, or heterocyclic group. $R^1$, $R^2$ and $R^3$ are the same or different and comprise H, $C_{1-8}$ alkyl group, $C_{1-8}$ alkoxy group, hydroxyl group, $C_{3-6}$ cycloalkyl group, $C_{1-4}$ fluoroalkyl group, or —NCS. n, m, i, and j are the same or different and comprise 0, 1, or 2.

Such dichroic dye has good photostability in addition to excellent solubility. A liquid crystal composition comprising the dichroic dye can exhibit an orientational order parameter of more than 0.7, preferably 0.8.

A dichroic dye composition is further provided, comprising at least to the above dichroic dyes, and can be used as a black dye composition. A liquid crystal composition comprising the dichroic dye composition can exhibit an orientational order parameter of more than 0.7, preferably 0.8.

The invention further provides a microencapsulated liquid crystal composition, comprising a liquid crystal and the above dichroic dye or dichroic dye composition, encapsulated in a wall formed of a polymer. Wherein, the polymer can be polyvinyl alcohol (PVA), polyurethane (PU), or polyurea, and the liquid crystal can comprise nematic liquid crystal, smectic liquid crystal, or cholesteric liquid crystal Further, in some embodiments a liquid crystal composition, comprising a liquid crystal and the above dichroic dye or dichroic dye composition, is also provided.

A liquid crystal device employing the aforementioned dichroic dye or dichroic dye composition is also provided. The liquid crystal device has an active circuit, a passive circuit, and a segment circuit, and can be transmissive, reflective, or semi-transmissive liquid crystal device.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
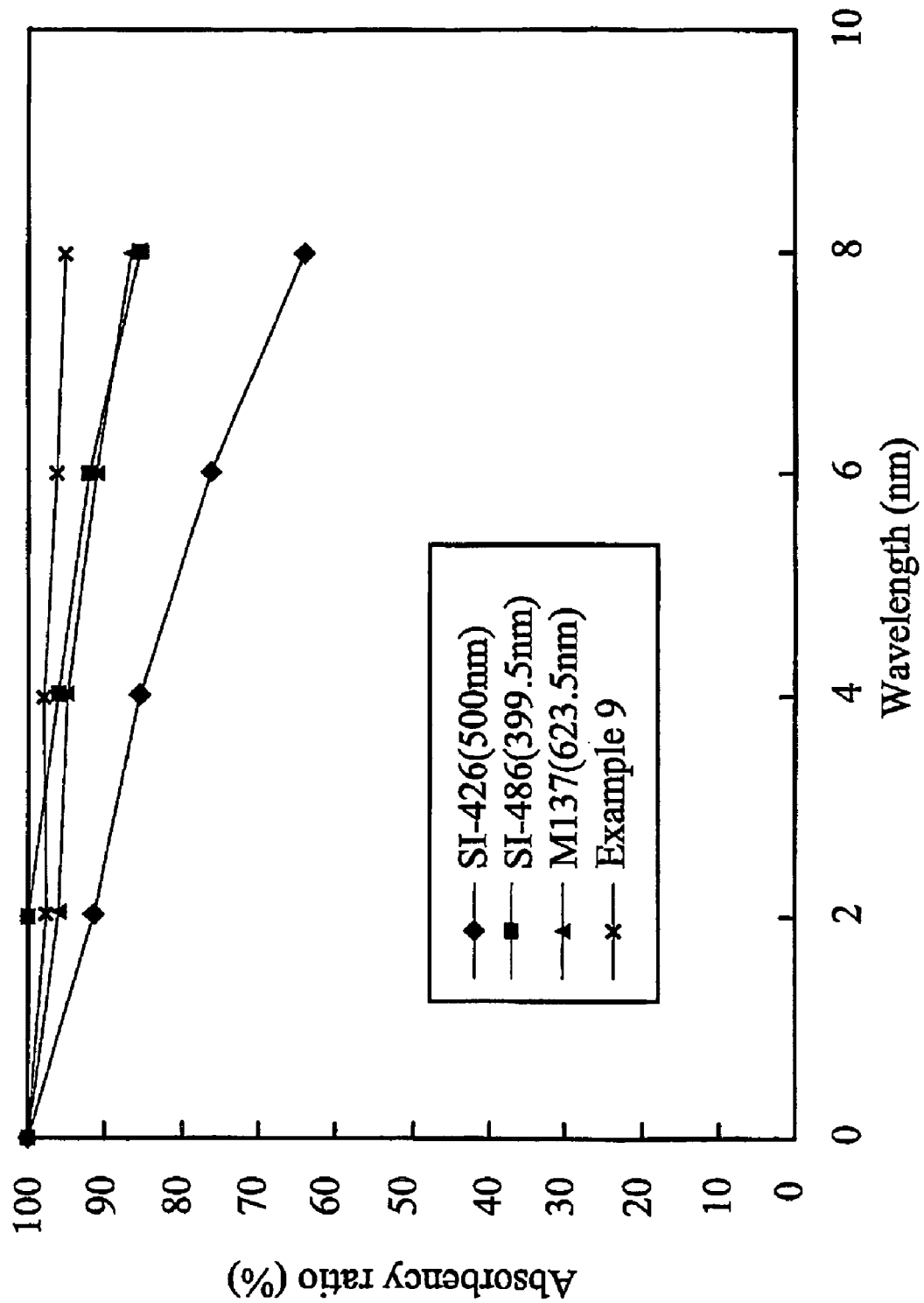
FIG. 1 is a plot of absorbance against time of irradiation for Compound 9 (provided by Example 2) and conventional dichroic dyes (SI-426, SI-486, and M137).

The embodiments of the invention provides the dichroic dyes according to formula (I) or (II) shown in Tables 1 and 2. In addition, the UV absorption wavelength, orientational order parameter, dichroic ratio, and color thereof are also evaluated and shown in Tables 1 and 2

TABLE 1

Doped liquid crystal: ZLI 1840
Weight ratio of dichroic dye: 1%

| Compound | structure | UV absorption (nm) | orientational order parameter | dichroic ratio | color |
|---|---|---|---|---|---|
| 1 | $C_6H_{13}O$—⟨phenyl⟩—N=N—⟨phenyl⟩=N—⟨phenyl⟩—$C_6H_{13}$ | 386 | 0.74 | 9.4 | Yellow |
| 2 | $C_6H_{13}O$—⟨phenyl⟩—N=N—⟨phenyl⟩=N—⟨phenyl⟩—N=N—⟨phenyl⟩—$OC_6H_{13}$ | 399 | 0.9 | 28.2 | yellow |
| 3 | $C_6H_{13}O$—⟨phenyl⟩—N=N—⟨phenyl⟩=N—⟨phenyl⟩—N=—⟨phenyl⟩—N=N—⟨phenyl⟩—$OC_6H_{13}$ | 405 | 0.84 | 16.8 | yellow |
| 4 | $C_2H_{15}$—⟨phenyl⟩—N=—⟨phenyl⟩—N=N—⟨phenyl⟩—N⟨piperazine⟩N—C(O)—$C_7H_{15}$ | 433 | 0.74 | 9.98 | yellow |
| 5 | $C_6H_{13}O$—⟨phenyl⟩—N=N—⟨phenyl⟩=N—⟨phenyl⟩—N=N—⟨phenyl⟩—N⟨piperazine⟩N—C(O)—$C_7H_{15}$ | 411 | 0.70 | 8 | yellow |

TABLE 1-continued

| Compound | structure | Doped liquid crystal: ZLI 1840 Weight ratio of dichroic dye: 1% | | | |
|---|---|---|---|---|---|
| | | UV absorption (nm) | orientational order parameter | dichroic ratio | color |
| 6 | C$_5$H$_{11}$-C(O)-N(piperazine)N-C$_6$H$_4$-N=N-C$_6$H$_4$-(thiadiazole)-N=N-C$_6$H$_4$-N(piperazine)N-C(O)-C$_5$H$_{11}$ | 488 | 0.6 | 5.5 | orange |
| 7 | (C$_2$H$_5$)$_2$N-C$_6$H$_4$-N=N-C$_6$H$_4$-C≡C-C$_6$H$_4$-N=N-C$_6$H$_4$-N(C$_2$H$_5$)$_2$ | 483 | 0.71 | 8.6 | orange |
| 8 | 1-(4-methylphenylthio)-5-chloroanthraquinone | 441 | 0.68 | 7.37 | yellow |
| 9 | 1-(4-(4-butoxybenzylideneamino)phenylthio)-5-chloroanthraquinone | 442 | 0.88 | 24.46 | yellow |
| 10 | 1-(4-((4-(4-dimethylaminophenylazo)phenyl)azo)phenylthio)-5-chloroanthraquinone | 474 | 0.7 | 8 | orange |
| 11 | 1-(4-(4-butoxybenzylideneamino)phenylamino)-5-chloroanthraquinone | 525 | 0.67 | 6.9 | red |
| 12 | 1-(4-((4-(4-(undecanoyl)piperazin-1-yl)phenyl)azo)phenylamino)-5-chloroanthraquinone | 506 | 0.71 | 8.6 | red |

TABLE 1-continued

| Compound | structure | Doped liquid crystal: ZLI 1840 Weight ratio of dichroic dye: 1% | | | |
|---|---|---|---|---|---|
| | | UV absorption (nm) | orientational order parameter | dichroic ratio | color |
| 13 | | 482 | 0.71 | 8.6 | orange |
| 14 | | 469 | 0.72 | 8.8 | orange |
| 15 | | 456 | 0.75 | 10 | yellow |
| 16 | | 557 | 0.67 | 7.2 | purple |
| 17 | | 558 | 0.68 | 7.6 | purple |

TABLE 1-continued

|  |  | Doped liquid crystal: ZLI 1840 Weight ratio of dichroic dye: 1% | | | |
|---|---|---|---|---|---|
| Compound | structure | UV absorption (nm) | orientational order parameter | dichroic ratio | color |
| 18 | | 651 | 0.43 | 3.3 | blue |
| 19 | | 587 | 0.6 | 5.5 | purple |
| 20 | | 589 | 0.7 | 8.3 | purple |
| 21 | | 586 | 0.7 | 8.3 | purple |

TABLE 2

Structure of dichroic dye:

[Anthraquinone structure with OH at 1,8 positions, G1 at 4-position, G2 at 5-position, with two C=O groups]

Doped liquid crystal: ZLI 1840

Weight ratio of dichroic dye: 1%

| compound | G1 | G2 | UV absorption (nm) | orientational order parameter | dichroic ratio | color |
|---|---|---|---|---|---|---|
| 22 | —NH—C$_6$H$_4$—CF$_3$ | —NO$_2$ | 588 | 0.41 | 3.1 | blue |
| 23 | | —NH$_2$ | 650 | 0.58 | 5.1 | blue |
| 24 | | —S—(2-naphthyl) | 643 | 0.76 | 10.5 | blue |
| 25 | | —S—C$_6$H$_4$—N=CH—C$_6$H$_4$—OC$_4$H$_9$ | 637 | 0.77 | 11 | blue |
| 26 | —NH—C$_6$H$_4$—C≡C—C$_6$H$_4$—C$_5$H$_{11}$ | —NO$_2$ | 632 | 0.39 | 3 | blue |
| 27 | | —NH$_2$ | 658 | 0.6 | 5.5 | blue |
| 28 | | —S—(2-naphthyl) | 648 | 0.77 | 11 | blue |
| 29 | | —S—C$_6$H$_4$—N=CH—C$_6$H$_4$—OC$_4$H$_9$ | 639 | 0.8 | 13 | blue |
| 30 | —NH—C$_6$H$_4$—N=N—C$_6$H$_4$—OC$_6$H$_{13}$ | —NO$_2$ | 399; 621 | 0.41 | 3.08 | green |
| 31 | | —NH$_2$ | 421; 650 | 0.58 | 5.14 | green |
| 32 | | —S—(2-naphthyl) | 410; 645 | 0.77 | 11 | green |
| 33 | | —S—C$_6$H$_4$—N=CH—C$_6$H$_4$—OC$_4$H$_9$ | 414; 638 | 0.81 | 13.78 | green |
| 34 | —NH—C$_6$H$_4$—N=N—C$_6$H$_4$—N=N—C$_6$H$_4$—OC$_6$H$_{17}$ | —NO$_2$ | 405; 628 | 0.45 | 3.5 | green |
| 35 | | —NH$_2$ | 425; 658 | 0.69 | 7.67 | green |

TABLE 2-continued

Structure of dichroic dye:

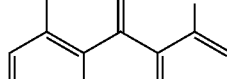

Doped liquid crystal: ZLI 1840

Weight ratio of dichroic dye: 1%

| compound | G1 | G2 | UV absorption (nm) | orientational order parameter | dichroic ratio | color |
|---|---|---|---|---|---|---|
| 36 | | —S—(2-naphthyl) | 414; 652 | 0.75 | 10 | green |
| 37 | | —S—C6H4—N=N—C6H4—OC4H9 | 418; 639 | 0.83 | 15.6 | green |

The following description is of the best-contemplated mode of carrying out the invention. This description is made for the purpose of illustrating the general principles of the invention and should not be taken in a limiting sense. The scope of the invention is best determined by reference to the appended claims.

Preparation of Dichroic Dye

EXAMPLE 1

Compound 7 synthesis: 1.17 g of 4-ethynylaniline and 25 ml of HCl (6N) were added into a round-bottom flask. After cooling to 0~5° C., 1 g of NaNO2 (dissolved in water) was added dropwise into the flask. After stirring for 2 hours, a diazonium salt/HCl mixture was obtained. Next, 1.64 g of N,N-diethylaniline, 20 ml of methanol, and 1 g of sodium acetate were added into a three-necked round-bottom flask equipped with a pH meter. After cooling to 0° C., the diazonium salt/HCl mixture was added dropwise into the three-necked round-bottom flask with a maintained pH value of 5~6 at a reaction temperature of less than 5° C. After stirring for 2 hours, the result was quenched by the addition of ice water, and the pH value was adjusted by NaOH (1N) to 6~7. By filtration and drying, an orange solid product in a 60% yield was obtained.

0.277 g of the obtained orange solid product, 0.4 g of copper acetate dehydrate, and 10 ml pyridine were added into a flask and heated at 50° C. for 30 min. After reacting completely, pyridine was removed by vacuum, and the result was purified by column chromatography from a mixed solvent (EA/n-hexane), giving Compound 7 as a orange solid in a 80% yield. The reaction according to Example 1 is shown below.

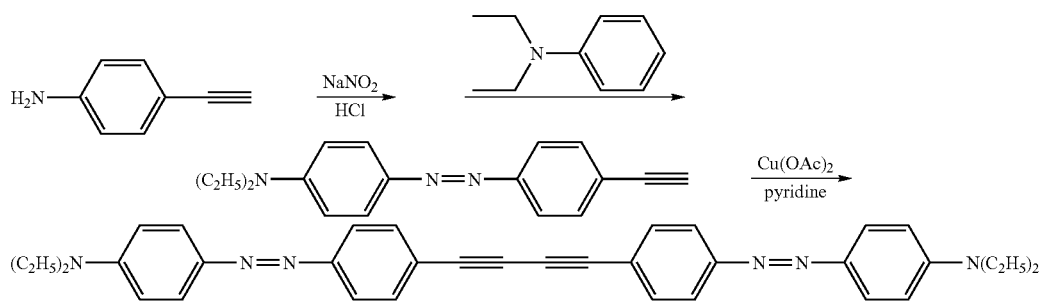

EXAMPLE 2

Compound 9 synthesis: 11.08 g of 1,5-dichloroanthraquinone and 5 g of 4-aminothiophenol, 8.47 g of sodium carbonate, and 150 ml dimethyl formamide (DMF) were added into a round-bottom flask. After stirring at 80° C. for 6 hours, the reaction was quenched by the addition of ice water, and the pH value was adjusted by diluted HCl to 6~7. By filtration and drying, a yellow solid product in a 85% yield was obtained.

0.36 g of the obtained yellow solid product, 0.178 g of 4-butoxybenzaldehyde, 0.05 g of tosylate (TsOH) and 100 ml toluene were added into a flask and heated at 150° C. to reflux via a Dean-Stark trap to remove water. After reacting for 24 hours, toluene was removed by vacuum, and the residue was dissolved in chloroform and subjected to recrystallization from CH$_2$Cl$_2$/MeOH, giving Compound 9 as a yellow solid in a 83% yield. The reaction according to Example 2 is shown below.

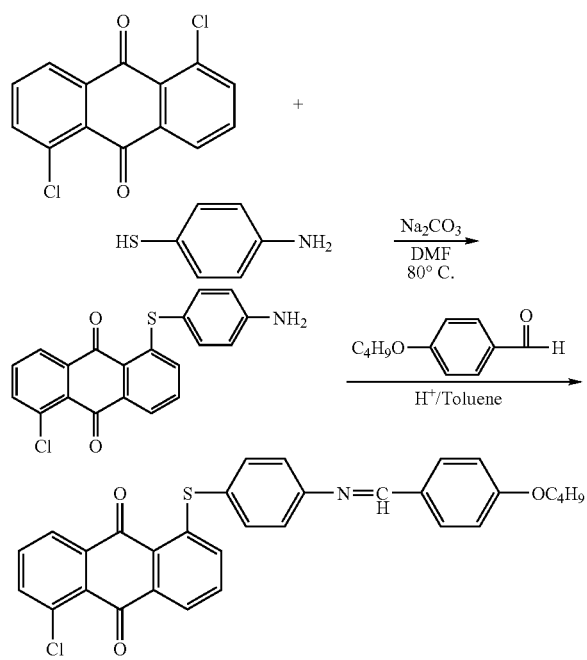

EXAMPLE 3

Compound 21 synthesis: 0.65 g of

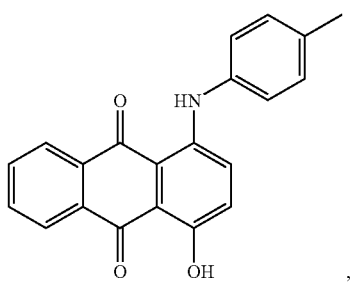

0.45 g of 2,3-Dichloro-5,6-dicyanobenzoquinone (DDQ), and 20 ml dioxane were added into a round-bottom flask. After stirring at 130° C. for 24 hours, the reaction was quenched by the addition of ice water, and the result was purified by filtration, drying, and column chromatography, giving a purple solid product in a 55% yield.

0.68 g of the obtained purple solid product, 0.4 g of 4-butoxyaniline, 0.1 g of tosylate (TsOH) and 100 ml toluene were added into a flask and heated at 150° C. to reflux via a Dean-Stark trap to remove water. After reacting for 24 hours, toluene was removed by vacuum, and the residue was dissolved in chloroform and subjected to recrystallization from CH$_2$Cl$_2$/MeOH, giving Compound 21 as a purple solid in a 85% yield. The reaction according to Example 3 is shown below.

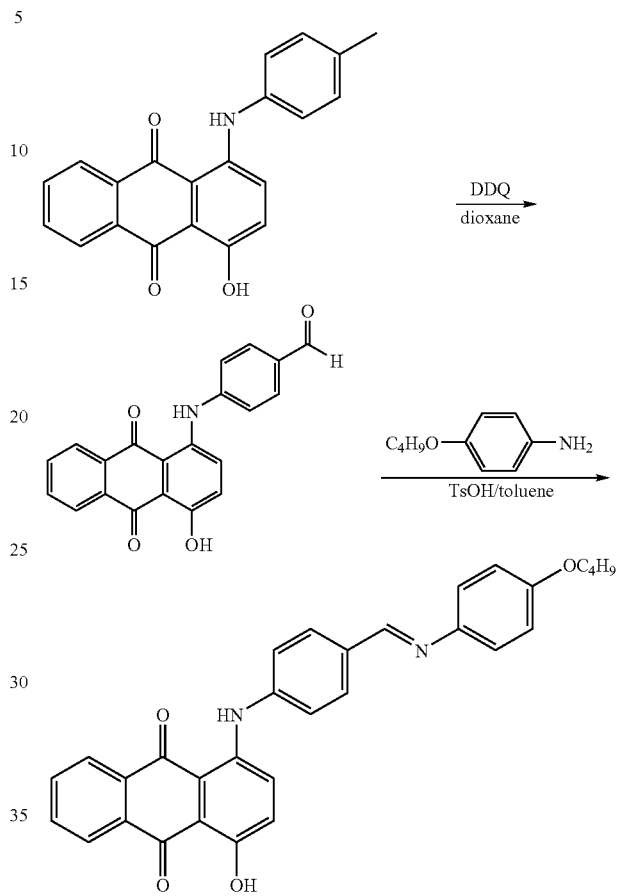

EXAMPLE 4

Compound 34 synthesis: 5 g of

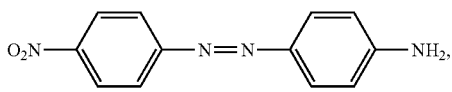

and 50 ml of HCl (6N) were added into a round-bottom flask. After cooling to 0~–5° C., 2.1 g of NaNO$_2$ (dissolved in water) was added dropwise into the flask. After stirring for 2 hours, a mixture was obtained. Next, 2.8 g of phenol, 40 ml of methanol, and 2 g of sodium acetate were added into a three-necked round-bottom flask equipped with a pH meter. After cooling to 0° C., the above mixture was added dropwise into the three-necked round-bottom flask with a maintained pH value of 8~9 at a reaction temperature of less than 5° C. After stirring for 2 hours, the reaction was quenched by the addition of ice water, and the pH value was adjusted by HCl (6N) to 6~7. By filtration and drying, an orange solid product in a 65% yield was obtained.

4 g of the obtained orange solid product, 3.86 g of octyl bromide, 5.5 g potassium carbonate and 100 ml ethanol were added into a flask and heated and refluxed at 100° C. for 24 hours. After reacting completely, the reaction was quenched by the addition of ice water, and the ph value was adjusted to 6~7. By filtration and drying, a yellow solid product in a 78% yield was obtained.

1.45 g of the obtained yellow solid product, 8.64 g of sodium sulfide 9-hydrate, and 100 ml ethanol were added into a flask and heated and refluxed at 100° C. for 1 hour. After reacting completely, the reaction was quenched by the addition of ice water. By filtration and drying, an orange solid product in a 80% yield was obtained.

0.86 g of the obtained orange solid product, 0.33 g of 1,5-dihydroxy-4,8-dinitroanthraquinone, and 10 ml nitrobenzene were added into a flask and heated and refluxed at 180° C. for 24 hour. After reacting completely, nitrobenzene was removed by vacuum. By filtration and drying, Compound 34 as a green solid in a 65% yield was obtained. The reaction according to Example 4 is shown below.

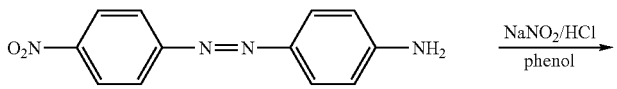

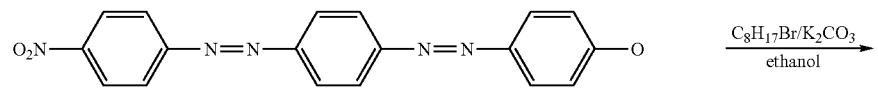

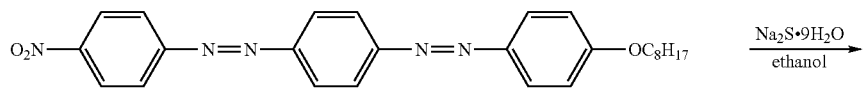

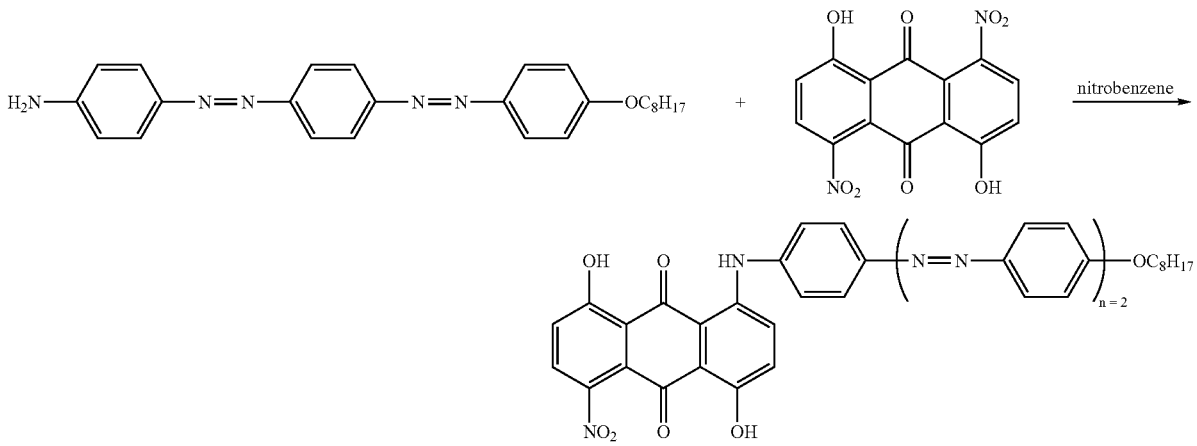

EXAMPLE 5

Compound 35 synthesis: 1.45 g of Compound 34 of Example, 6 g of sodium sulfide 9-hydrate, 10 ml of water and 100 ml ethanol were added into a flask and heated and refluxed at 100° C. for 4 hours. After reacting completely, the reaction was quenched by the addition of ice water. By filtration and drying, Compound 35 as a green solid product in a 70% yield was obtained. The reaction according to Example 5 is shown below.

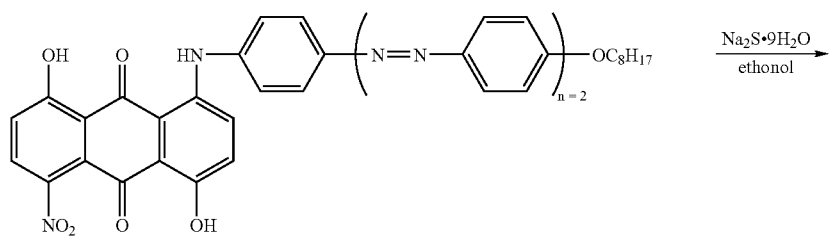

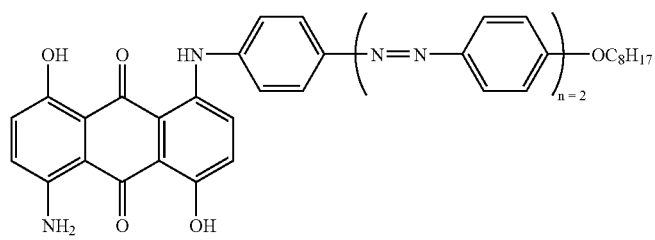

EXAMPLE 6

Compound 36 synthesis: 0.72 g of Compound 34 of Example, 0.3 g of sodium carbonate, 0.2 g of 2-naphthalenethiol and 10 ml of DMF were added into a flask and heated and refluxed at 80° C. for 4 hours. After reacting completely, the reaction was quenched by the addition of ice water. By filtration and drying, compound 36 as a green solid product in a 85% yield was obtained. The reaction according to Example 6 is shown below.

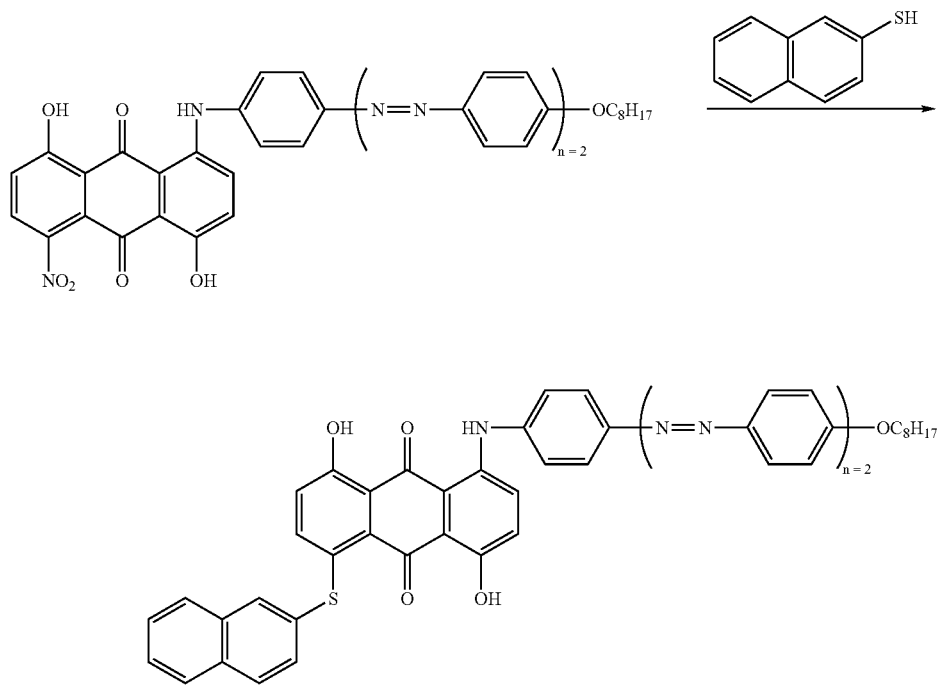

Compound 9 (provided by Example 2), and conventional dichroic dyes (SI-426, SI-486, and M137) were irradiated with UV light having a wavelength of 350 nm from a UV tube, and the absorbance in the UV-visible range was measured, thereby estimating photostability thereof. The absorbance was plotted against the time of irradiation for comparing the photostability of the samples. The results are shown in Table 3 and FIG. 1.

TABLE 3

| Time(hr) | UV-Visible absorbance | | | |
|---|---|---|---|---|
| | SI-426 | SI-486, | M137 | compound 9 |
| 0 | 100.0 | 100 | 10 | 100.0 |
| 2 | 91.8 | 100 | 96.1 | 97.8 |
| 4 | 85.9 | 96.2 | 95.1 | 98.1 |
| 6 | 76.4 | 92.0 | 91.5 | 96.4 |
| 8 | 64.3 | 85.9 | 86.3 | 95.2 |

Black Dichroic Dye Composition

EXAMPLE 7

0.76 of Compound 4, 0.17 g of Compound 10, 0.13 g of Compound 12, and 0.29 g compound 18 (shown in Table 1) were mixed to obtain a black dichroic dye composition. The color and weight ratio of the components of the black dichroic dye composition was shown in Table 4.

TABLE 4

| Compoments | compound 4 | compound 10 | compound 12 | compound 18 |
|---|---|---|---|---|
| Color | yellow | orange | red | blue |
| Weight ratio % | 56.3 | 12.6 | 9.6 | 21.5 |

The black dichroic dye composition of Example 7 was dissolved in ZLI-5100-100 (Trademark, liquid crystal product sold by E. Merck, Germany) so that the weight of the dye mixture was 0.85% of the weight of the liquid crystal product, forming a full wavelength range (400~700 nm) absorbance type guest-host dichroic dye liquid crystal composition. The composition exhibited black color and had an acceptable dichroic ratio and solubility in addition to excellent photostability.

Figure 2:
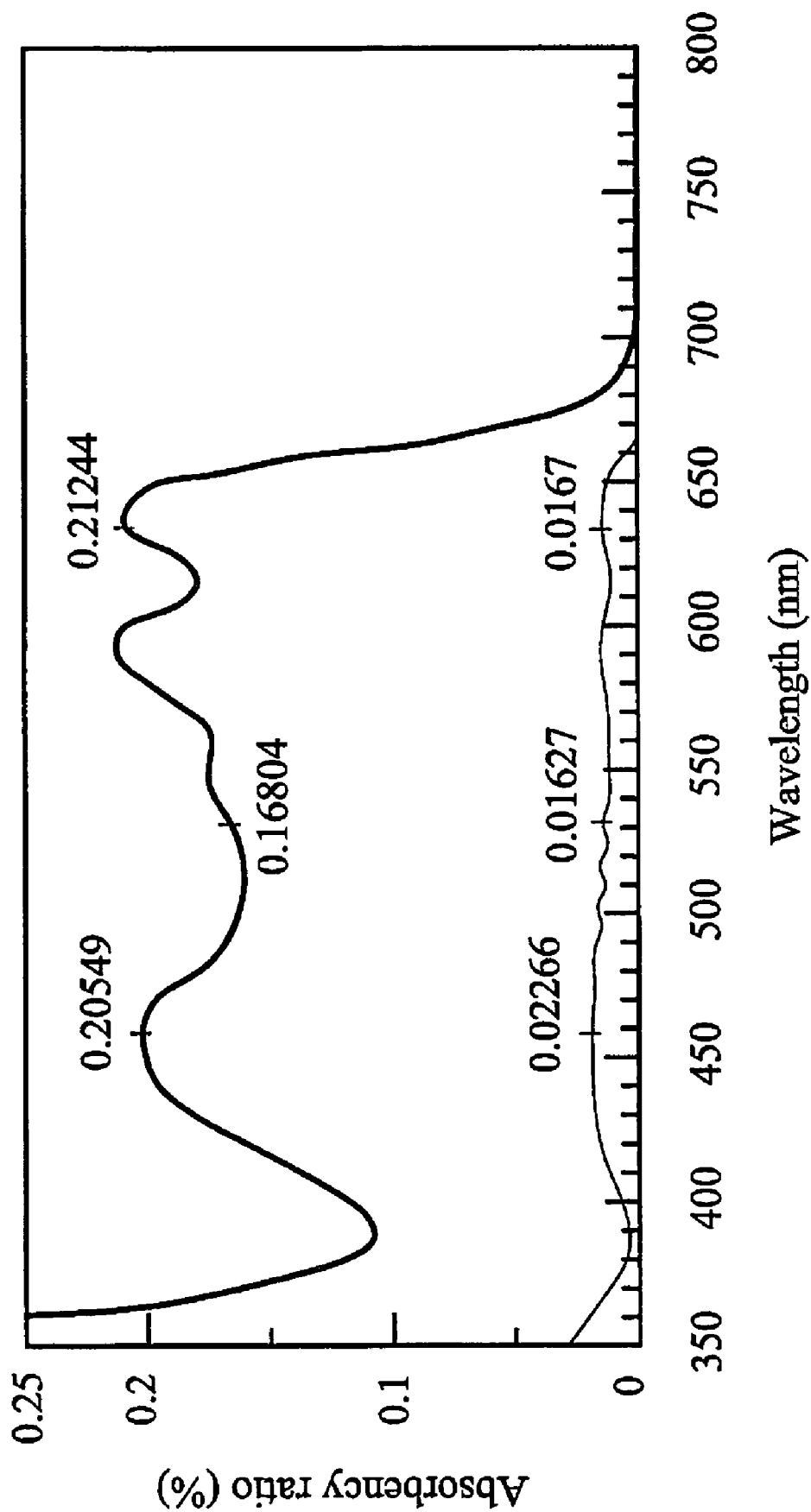
FIG. 2 is a plot of absorbance against wavelength detected for polarized light parallel to the alignment direction and for polarized light perpendicular to the alignment direction through the dichroic dye composition of Example 7.

A normally black homogeneous test sample having a thickness between 6 and 8 μm was prepared from the aforementioned guest-host dichroic dye liquid crystal composition. The test sample and a polarizer were collocated, the brightness was then determined by ELDIM. The results are shown in FIG. 2. The test sample had a good dichroic ratio (N). For example, at the wavelength of 426 nm, the dichroic ratio was 9.0 and the order parameter (SD) was 0.73; at the wavelength of 580 nm, the dichroic ratio was 10.3 and the order parameter was 0.76; at the wavelength of 630 nm, the dichroic ratio was 12.7 and the order parameter was 0.8.

Preparation of Microencapsulated Liquid Crystal Composition

EXAMPLE 8

0.06 g of black dichroic dye composition (Example 7) and 5 g of E7 (trademark, nematic liquid crystal product sold by E. Merck, Germany) was added into a flask. After heating and stirring for 2 hours, the mixture was maintained at room temperature for 8 hours. Next, the mixture was filtered via PTFA filter (sold by Aldrich Chemical Co.) to obtain a liquid crystal composition. Next, 0.1 g of desmodur N-3200 (sold by Bayer Corporation) and 2 g of the obtained liquid crystal composition were added into a flask and stirred for 15 min at 60° C. The mixture was slowly added into a flask with 10 g of 10% PVA (with a trademark Airvol V205, sold by Air Products). Next, the result was emulsified at 50° C. and 3000 rpm for 2 min, and 0.6 g of 10% DABCO (sold by Aldrioh Chemical Co.), 0.75 g of triethanolamine, 0.34 g of diethanolamine, and 0.07 g of dibutyltin diacetate (sold by Aldrich Chemical Co.) were added thereinto at 50° C. and 500 rpm for 8 hours. Then, the reaction was quenched by addition of 0.15 g $NH_4OH_{(aq)}$ (10 wt %) and stood for 8 hours. The result was purified via a centrifuge to obtain a microencapsulated liquid crystal composition with a low dimension of 3~4 μm (measured by polarizing microscope).

Figure 3:
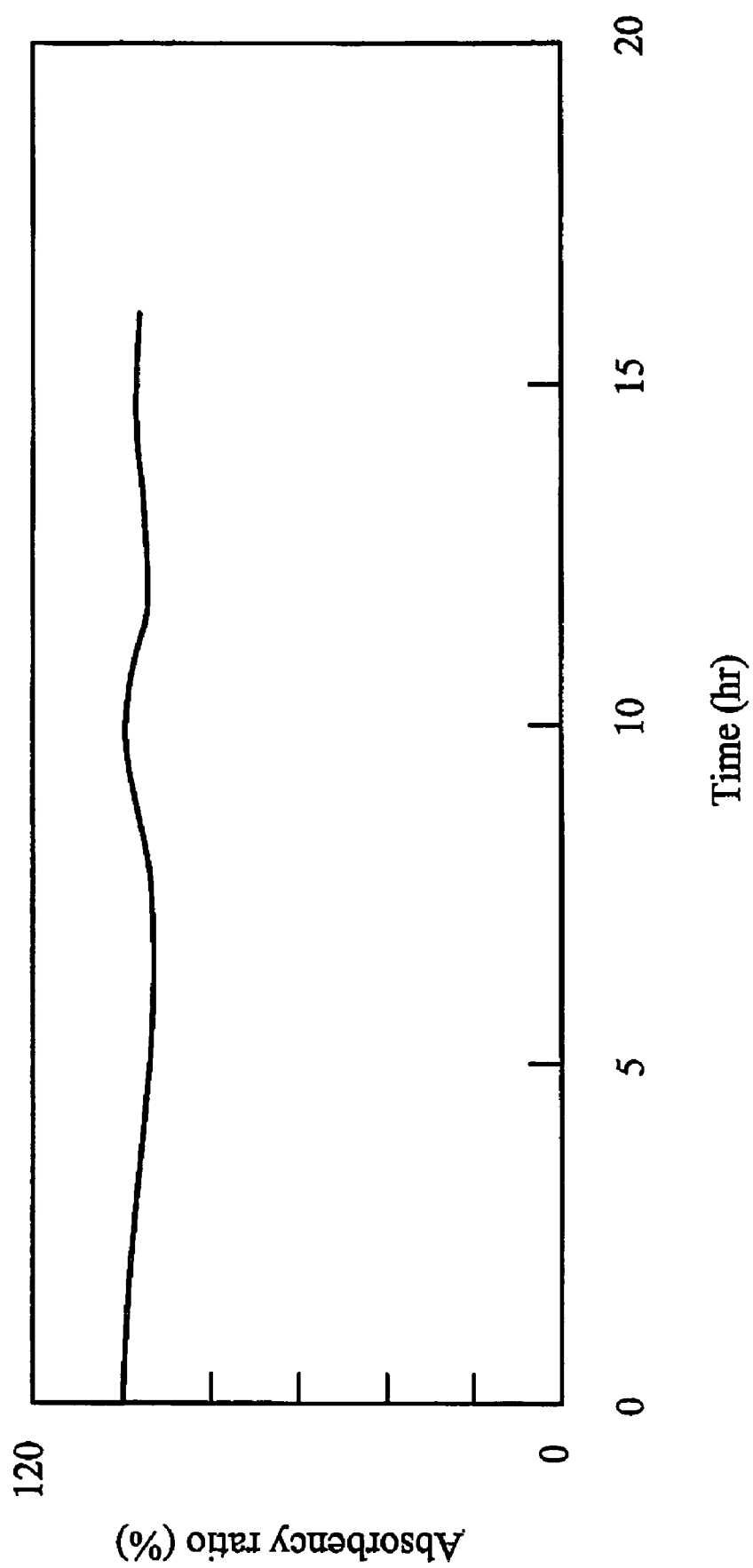
FIG. 3 is a plot of absorbance against time of irradiation for the microencapsulated liquid crystal composition of Example 8.

Photostability of the microencapsulated liquid crystal composition of Example 8 was irradiated with UV light having a wavelength of 350 nm from a UV tube, and the absorbance in the UV-visible range was measured. The absorbance was plotted against the time of irradiation for comparing the photostability of the samples. The result is shown in Table 5 and FIG. 3.

TABLE 5

| | time(hr) | | | | | | | |
|---|---|---|---|---|---|---|---|---|
| | 0 | 2 | 4 | 6 | 8 | 10 | 12 | 14 | 16 |
| absorptivity | 100 | 98.847 | 95.693 | 94.353 | 95.015 | 100.475 | 94.340 | 97.261 | 96.654 |

Figure 4:
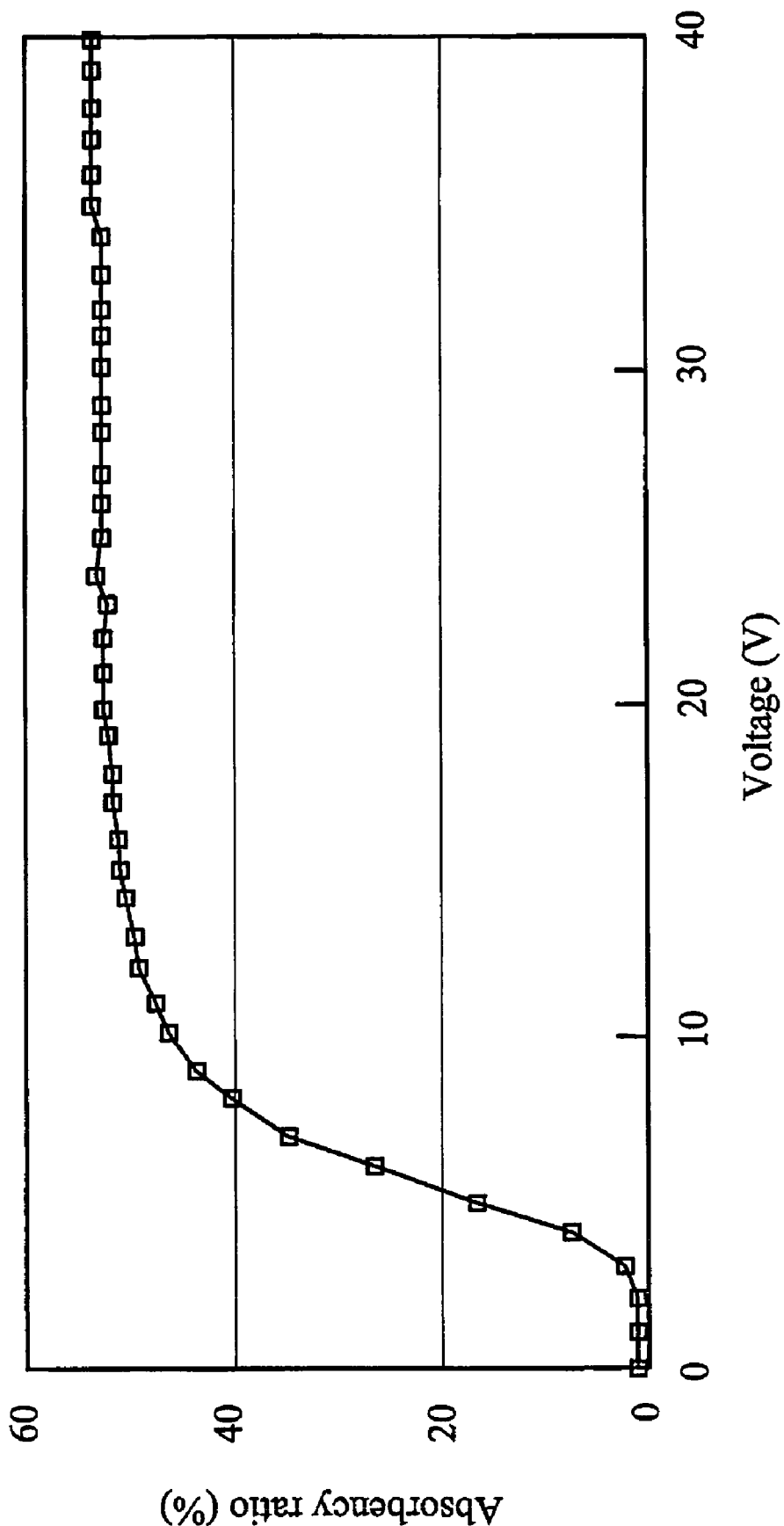
FIG. 4 is a plot of absorbency ratio against voltage for the microencapsulated liquid crystal composition of Example 8.

Further, the microencapsulated liquid crystal composition of Example 8 was dissolved in DH0381-110 (Trademark, liquid crystal product sold by E. Merck, Germany), and coated on a substrate to form a film with a thickness of 50 μm. Next, optical/electrical properties of the film were measured via LCD5100 (manufactured by Otsuka). The result is shown in Table 6 and FIG. 4.

TABLE 6

| V90/V10 | 3.25 |
|---|---|
| Response time | 110.9 |
| T(on) | 556 |
| T(off) | 55.3 |
| Contrast | 35 |
| thickness | 50 μm |

Figure 5:
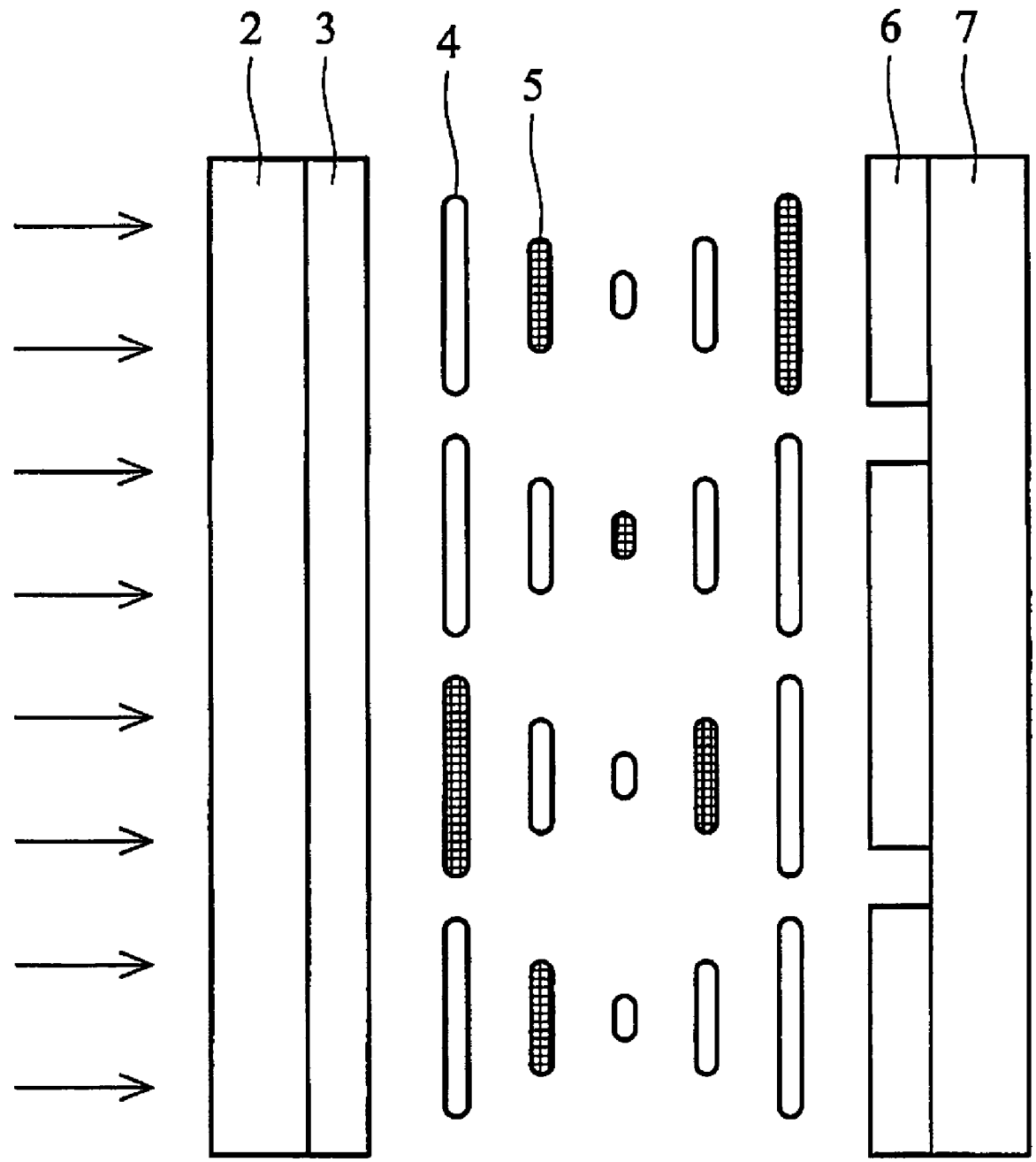
FIG. 5 shows a schematic cross-section of the reflective guest-host mode liquid crystal device of the present invention when the voltage is not applied to liquid crystal layer.
Figure 6:
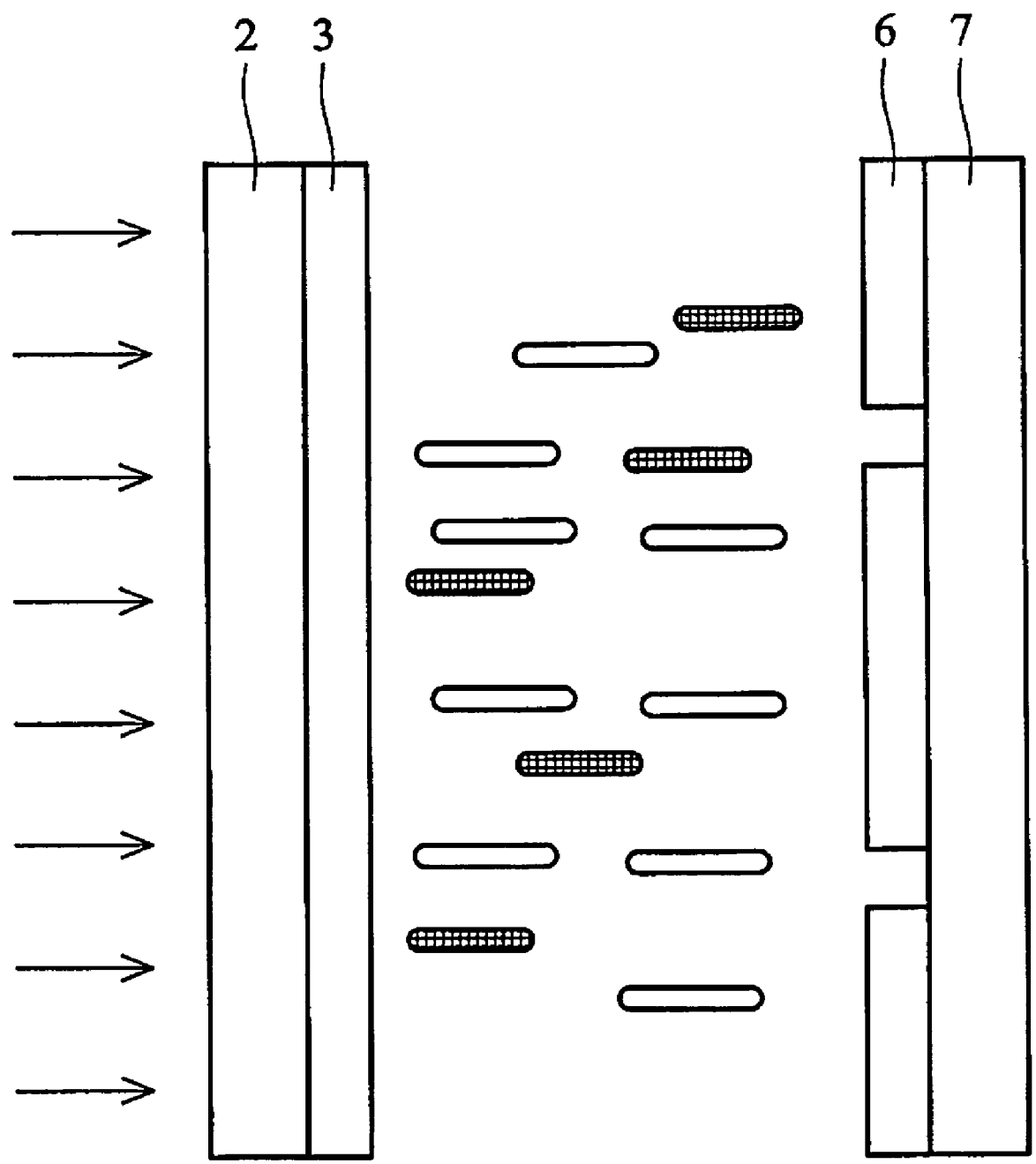
FIG. 6 shows a schematic cross-section of the reflective guest-host mode liquid crystal device of the present invention when the voltage is applied to the liquid crystal layer.

The weight ratio between the dichroic dye and the liquid crystal is 1:200~1:20, more preferably 1:100~3:100, most preferably 1:40~3:100. The liquid crystal composition or the microencapsulated liquid crystal composition comprising the dichroic dye (or dichroic dye composition) exhibits an orientational order parameter of more than 0.7, preferably more than 0.8. The invention further provides a reflective guest-host mode liquid crystal device comprising the dichroic dye (or dichroic dye composition) doping in the liquid crystal. FIG. 5 shows that the liquid crystal compound 4 and dichroic dyes 5 together exhibit a cholesteric phase, whereby the incident light 1 which may be natural light, will be absorbed by the dyes 5, and thus the display exhibits a black color. When a voltage is applied (FIG. 6), the liquid crystal compound 4 and the dichroic dyes 5 align in the direction of the electric field, whereby the light 1 passes through the liquid crystal layer and is reflected by the reflective electrode 6 or reflected substrate 7, and thus the display exhibits brightness.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dichroic dye having a formula (I), of:

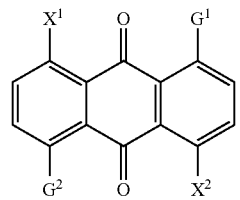

or formula (II), of:

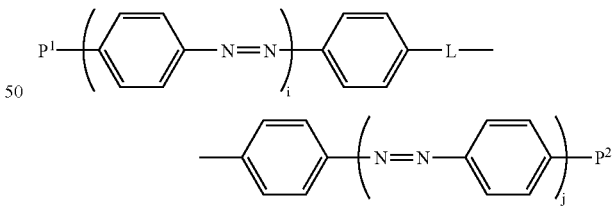

wherein, $X^1$ and $X^2$ are the same or different and comprise —H, —OH, or —NH$_2$;

$G^1$ is

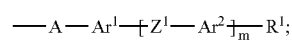

$G^2$ is H, F, Cl, Br, —NH$_2$, —NO$_2$, or

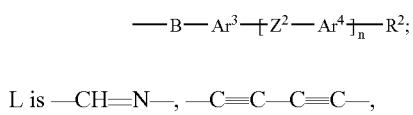

L is —CH=N—, —C≡C—C≡C—,

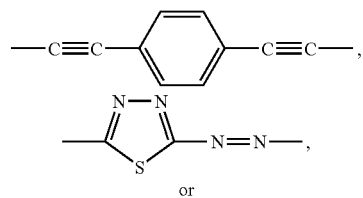

or

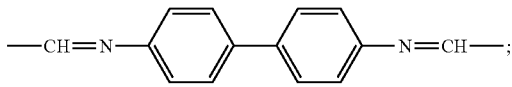

$P^1$ and $P^2$ are the same or different and comprise —H, —$R^3$, —$OR^3$, —$NHR^3$, —$N(R^3)_2$, or

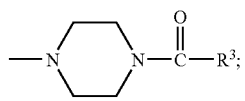

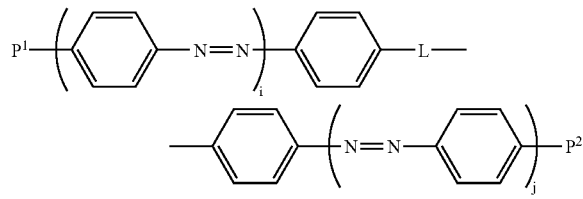

wherein,
$X^1$ and $X^2$ are the same or different and comprise —H, —OH, or —$NH_2$;
$G^1$ is

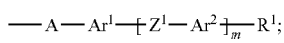

$G^2$ is H, F, Cl, Br, —$NH_2$, —$NO_2$, or

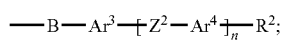

L is —CH=N—, —C≡C—C≡C—,

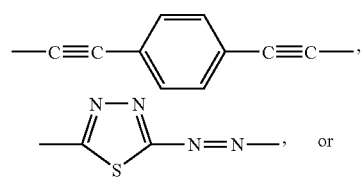

-continued

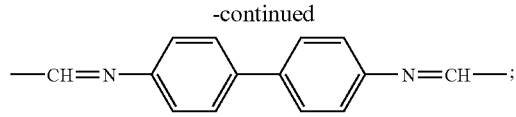

$P^1$ and $P^2$ are the same or different and comprise —H, —$R^3$, —$OR^3$, —$NHR^3$, —$N(R^3)_2$, or

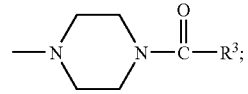

A and B independently comprise O, S, or —NH—;
$Z^1$ and $Z^2$ are the same or different and comprise O, S, —C=C—, —C≡C—, —CH=N—, —N=N—, —CH=N—,

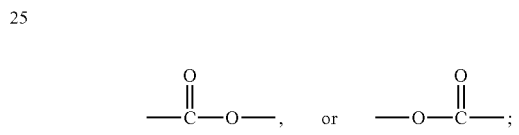

$Ar^1$ and $AR^2$ are the same or different and comprise the phenyl group, biphenyl group, naphthyl group, or heterocyclic group;
$AR^3$ and $AR^4$ are the same or different and comprise the phenyl group, biphenyl group, or heterocyclic group;
$R^1$, $R^2$ and $R^3$ are the same or different and comprise H, $C_{1-8}$ alkyl group, $C_{1-8}$ alkoxy group, hydroxyl group, $C_{3-6}$ cycloalkyl group, $C_{1-4}$ fluoroalkyl group, or —NCS; and
n, m, i, and j are the same or different and comprise 0, 1, or 2.

2. The dichroic dye as claimed in claim 1, wherein a liquid crystal compound doped with the dichroic dye exhibits an orientational order parameter of more than 0.7.

3. The dichroic dye as claimed in claim 1, wherein a liquid crystal compound doped with the dichroic dye exhibits an orientational order parameter of more than 0.8.

4. A dichroic dye composition, comprising at least two dichroic dyes having a formula (I), of:

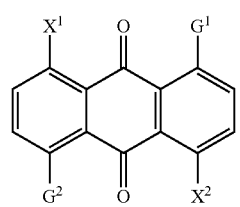

or formula (II), of:

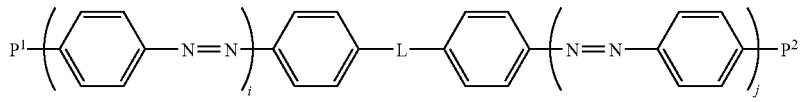

wherein, $X^1$ and $X^2$ are the same or different and comprise —H, —OH, or —NH$_2$;

$G^1$ is

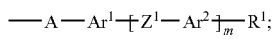

$G^2$ is H, F, Cl, Br, —NH$_2$, —NO$_2$, or

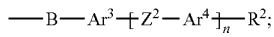

L is —CH=N—, —C≡C—C≡C—,

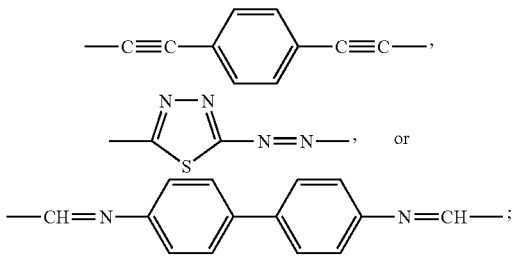

$P^1$ and $P^2$ are the same or different and comprise —H, —R$^3$, —OR$^3$, —NHR$^3$, —N(R$^3$)$_2$, or

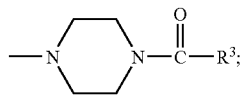

A and B independently comprise O, S, or —NH—;

$Z^1$ and $Z^2$ are the same or different and comprise O, S, —C=C—, —C≡C—, —CH=N—, —N=N—, —CH=N—,

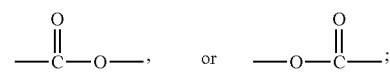

$Ar^1$ and $AR^2$ are the same or different and comprise the phenyl group, biphenyl group, naphthyl group, or heterocyclic group;

$AR^3$ and $AR^4$ are the same or different and comprise the phenyl group, biphenyl group, or heterocyclic group;

$R^1$, $R^2$ and $R^3$ are the same or different and comprise H, $C_{1-8}$ alkyl group, $C_{1-8}$ alkoxy group, hydroxyl group, $C_{3-6}$ cycloalkyl group, $C_{1-4}$ fluoroalkyl group, or —NCS; and n, m, i, and j are the same or different and comprise 0, 1, or 2.

5. The dichroic dye composition as claimed in claim 4, wherein a liquid crystal compound doped with the dichroic dye composition exhibits an orientational order parameter of more than 0.7.

6. The dichroic dye composition as claimed in claim 4, wherein a liquid crystal compound doped with the dichroic dye composition exhibits an orientational order parameter of more than 0.8.

7. The dichroic dye composition as claimed in claim 4, wherein the dichroic dye composition is a black dichroic dye composition.

8. A microencapsulated liquid crystal composition, comprising a liquid crystal and a dichroic dye encapsulated in a wall formed of a polymer, wherein the dichroic dye has a formula (I), of:

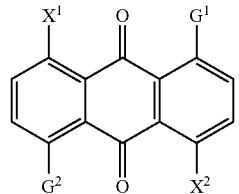

or formula (II), of:

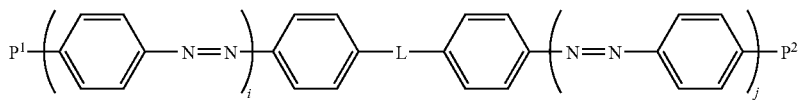

wherein, $X^1$ and $X^2$ are the same or different and comprise —H, —OH, or —NH$_2$;

$G^1$ is

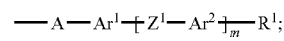

$G^2$ is H, F, Cl, Br, —NH$_2$, —NO$_2$, or

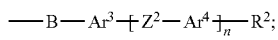

L is —CH=N—, —C≡C—C≡C—,

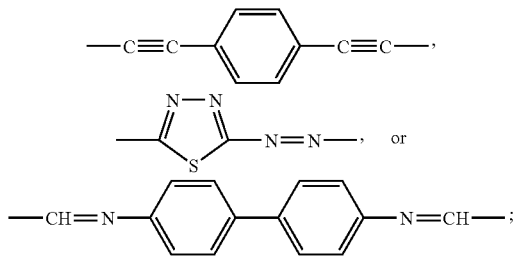

$P^1$ and $P^2$ are the same or different and comprise —H, —$R^3$, —$OR^3$, —$NHR^3$, —$N(R^3)_2$, or

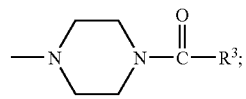

A and B independently comprise O, S, or —NH—;
$Z^1$ and $Z^2$ are the same or different and comprise O, S, —C=C—, —C≡C—, —CH=N—, —N=N—, —CH=N—,

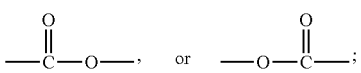

$Ar^1$ and $AR^2$ are the same or different and comprise the phenyl group, biphenyl group, naphthyl group, or heterocyclic group;
$AR^3$ and $AR^4$ are the same or different and comprise the phenyl group, biphenyl group, or heterocyclic group;
$R^1$, $R^2$ and $R^3$ are the same or different and comprise H, $C_{1-8}$ alkyl group, $C_{1-8}$ alkoxy group, hydroxyl group, $C_{3-6}$ cycloalkyl group, $C_{1-4}$ fluoroalkyl group, or —NCS; and
n, m, i, and j are the same or different and comprise 0, 1, or 2.

9. The microencapsulated liquid crystal composition as claimed in claim 8, wherein the polymer comprises polyvinyl alcohol (PVA), polyurethane (PU), or polyurea.

10. The microencapsulated liquid crystal composition as claimed in claim 8, wherein the liquid crystal comprises nematic liquid crystal, smectic liquid crystal, or cholesteric liquid crystal.

11. The microencapsulated liquid crystal composition as claimed in claim 8, wherein the microencapsulated liquid crystal composition comprising the liquid crystal and at least two dichroic dyes having the formula (I) or (II).

12. A liquid crystal composition, comprising:
a liquid crystal; and
a dichroic dye having a formula (I), of:

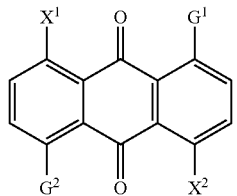

or formula (II), of:

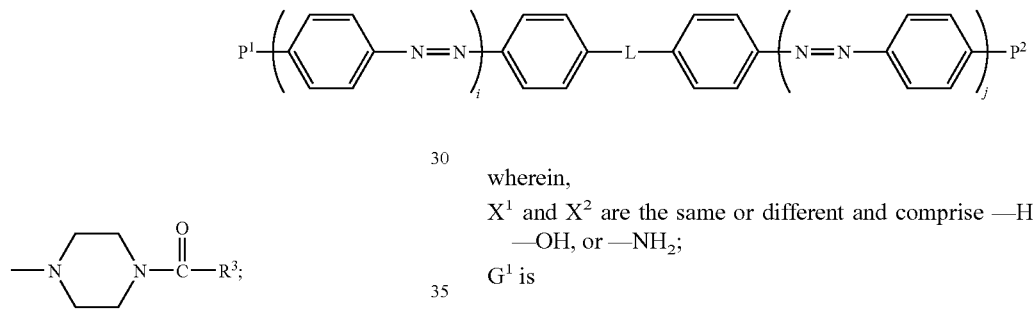

wherein,
$X^1$ and $X^2$ are the same or different and comprise —H, —OH, or —$NH_2$;
$G^1$ is

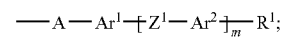

$G^2$ is H, F, Cl, Br, —$NH_2$, —$NO_2$, or

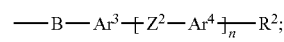

L is —CH=N—, —C≡C—C≡C—,

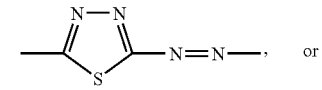

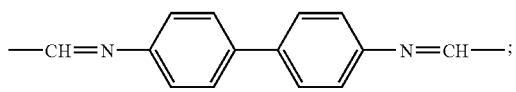

$P^1$ and $P^2$ are the same or different and comprise —H, —$R^3$, —$OR^3$, —$NHR^3$, —$N(R^3)_2$, or

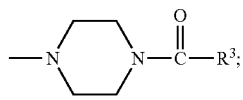

A and B independently comprise O, S, or —NH—;

$Z^1$ and $Z^2$ are the same or different and comprise O, S, —C=C—, —C≡C—, —CH=N—, —N=N—, —CH=N—,

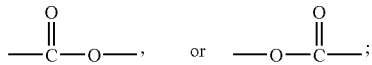

Ar$^1$ and AR$^2$ are the same or different and comprise the phenyl group, biphenyl group, naphthyl group, or heterocyclic group;

AR$^3$ and AR$^4$ are the same or different and comprise the phenyl group, biphenyl group, or heterocyclic group;

R$^1$, R$^2$ and R$^3$ are the same or different and comprise H, $C_{1-8}$ alkyl group, $C_{1-8}$ alkoxy group, hydroxyl group, $C_{3-6}$ cycloalkyl group, $C_{1-4}$ fluoroalkyl group, or —NCS; and n, m, i, and j are the same or different and comprise 0, 1, or 2.

13. The liquid crystal composition as claimed in claim 12, wherein the liquid crystal comprises nematic liquid crystal, smectic liquid crystal, or cholesteric liquid crystal.

14. The liquid crystal composition as claimed in claim 12, wherein the liquid crystal composition comprising the liquid crystal and at least two dichroic dyes having the formula (I) or (II).

15. A liquid crystal device, comprising a liquid crystal composition or a microencapsulated liquid crystal composition, wherein the liquid crystal composition or a microencapsulated liquid crystal composition comprises the dichroic dye as claimed in claim 1.

16. The liquid crystal device as claimed in claim 15, wherein the liquid crystal device employs an active circuit.

17. The liquid crystal device as claimed in claim 1, wherein the liquid crystal device employs a passive circuit.

18. The liquid crystal device as claimed in claim 15, wherein the liquid crystal device employs a segment circuit.

19. The liquid crystal device as claimed in claim 15, wherein the liquid crystal device is a transmissive liquid crystal device.

20. The liquid crystal device as claimed in claim 15, wherein the liquid crystal device is a reflective displays liquid crystal device.

21. The liquid crystal device as claimed in claim 15, wherein the liquid crystal device is a semi-transmissive liquid crystal.

* * * * *